US006714700B2

(12) United States Patent
Burger et al.

(10) Patent No.: US 6,714,700 B2
(45) Date of Patent: Mar. 30, 2004

(54) MICRO ELECTROMECHANICAL SYSTEM AND METHOD FOR TRANSMISSIVELY SWITCHING OPTICAL SIGNALS

(75) Inventors: Gerardus Johannes Burger, Hengelo (NL); Job Elders, Hengelo (NL); Vincentius Laurentius Spiering, Enschede (NL); Hendrik Harmen van den Vlekkert, Haaksbergen (NL)

(73) Assignee: Avanex Corporation, Fremont, CA (US)

( * ) Notice: Subject to any disclaimer, the term of this patent is extended or adjusted under 35 U.S.C. 154(b) by 0 days.

(21) Appl. No.: 09/834,492

(22) Filed: Apr. 13, 2001

(65) Prior Publication Data

US 2002/0037128 A1 Mar. 28, 2002

(30) Foreign Application Priority Data

Apr. 16, 2000 (NL) .............................................. 1014958
May 8, 2000 (NL) .............................................. 1015131

(51) Int. Cl.⁷ .............................. G02B 6/35; G02B 6/42
(52) U.S. Cl. .............................. 385/17; 385/18; 385/19
(58) Field of Search ...................................... 385/16–23

(56) References Cited

U.S. PATENT DOCUMENTS

| 4,867,532 | A | | 9/1989 | Stanley .................... 350/162.33 |
|---|---|---|---|---|
| 5,214,727 | A | | 5/1993 | Carr et al. ...................... 385/22 |
| 5,757,536 | A | | 5/1998 | Ricco et al. ................. 359/224 |
| 5,841,917 | A | | 11/1998 | Jungerman et al. ............ 385/17 |
| 5,864,643 | A | | 1/1999 | Pan ............................... 385/33 |
| 5,905,571 | A | | 5/1999 | Butler et al. ................. 356/328 |
| 5,912,608 | A | * | 6/1999 | Asada ........................ 352/222 |
| 5,917,647 | A | | 6/1999 | Yoon ........................... 359/298 |
| 5,923,480 | A | * | 7/1999 | Labeye ........................ 359/814 |
| 5,960,132 | A | | 9/1999 | Lin ............................... 385/18 |
| 5,995,688 | A | | 11/1999 | Aksyuk et al. ................ 385/14 |
| 6,091,537 | A | * | 7/2000 | Sun et al. ..................... 359/248 |
| 6,201,631 | B1 | * | 3/2001 | Greywall ..................... 359/245 |
| 6,445,514 | B1 | * | 9/2002 | Ohnstein et al. ............. 359/813 |

FOREIGN PATENT DOCUMENTS

| EP | 0 834 759 | 4/1998 |
|---|---|---|
| NL | 1014958 | 4/2000 |
| NL | 1015131 | 5/2000 |
| WO | WO/98/09289 | 3/1998 |
| WO | WO/00/79311 | 12/2000 |

* cited by examiner

Primary Examiner—Akm Enayet Ullah
Assistant Examiner—Jerry T Rahll
(74) Attorney, Agent, or Firm—Wilson Sonsini Goodrich & Rosati; Kenta Suzue

(57) ABSTRACT

An optical switch and method of making in which a large number of optical elements, which may be diffractive or refractive, are formed within the plane of a wafer to transmit light approximately perpendicularly to the wafer plane. The optical elements are formed on separate deformable mechanical elements, such as a plate rotatable about two axes lying approximately parallel to the wafer plane. Electrical elements, such as capacitor plates with a free-space gap therebetween selectively deform the mechanical elements in a micro electromechanical system (MEMS) arrangement with the optical elements disposed upon the mechanical elements to separately control the directions in which the light beams are transmitted. The optical switches may be formed in an array, and two levels of such arrays formed in separate wafers which are bonded together allow two-stage switching of light through the assembled structure.

20 Claims, 4 Drawing Sheets

MICRO ELECTROMECHANICAL SYSTEM AND METHOD FOR TRANSMISSIVELY SWITCHING OPTICAL SIGNALS

BACKGROUND OF THE INVENTION

1. Field of the Invention

The invention relates to a device and method for switching optical signals or beams. Such a device or method may, for example, be used in telecommunications equipment, computers or screens.

2. Background Art

Optical switches are known in which several beams of light derived from a number of incoming glass fibers are deflected in a controlled manner and selectively engaged in a number of outgoing glass fibers. For this purpose retractable reflecting elements are placed in the paths of the light beams (for example, U.S. Pat. Nos. 5,841,917, 5,960,132, and 5,995,688). In addition, switches are known in which an incoming glass fiber can be offset in relation to the outgoing glass fibers (for example, U.S. Pat. Nos. 5,214,727 and 5,864,643). The mechanical construction of both types of switches is complex and the possibilities of parallel and series connection are very limited.

There are also systems utilizing reflecting elements which can be controllably rotated about one or more axes, and which can deflect a beam of light in a desired direction (for example Published International Application WO 9809289, European Patent Publication EP 0834759, and U.S. Pat. No. 5,917,647). These systems are mainly used for producing images.

Accordingly, it is desired to provide a system and method with which a number of optical signals or beams can be switched without the disadvantages and limitations of the above-mentioned optical switches.

SUMMARY OF THE INVENTION

Many of the disadvantages of the prior art can be overcome according to the invention by making use of transmissive optical elements that may be diffractive or refractive and whose orientation or position can be regulated in a controlled manner.

One embodiment of the invention is device comprising an optical element which at least partially transmits optical radiation and whose position is adjustable. Position refers here to the orientation (angle) or position (location). The optical radiation may, for example, be in the form of a digital signal or a frequency- or amplitude-modulated beam. When the position is adjusted, the orientation of the element is regulated relative to an incoming signal or beam (rotation), or possibly its position (translation). The term optical means in this case that the element interacts with the electromagnetic radiation passing through it and does not exclude optical frequencies outside the visible spectrum. In particular, it includes infrared frequencies conveyed by optical fiber. An advantage of such a device is that it is possible to use several elements in series. In principle, the number of switching possibilities (in series) is therefore nearly unlimited.

In a preferred embodiment the optical element is diffractive. It may be fabricated, for example, from a number of thin patterned layers which can be deposited on a substrate by means of a vacuum processing techniques such as sputtering or chemical vapor deposition, and formed by means of abrasive or etching techniques, whether or not combined with lithographic techniques. The advantage of using such diffractive elements is the possibility of installing a large number of elements on a small surface with a high degree of precision. This construction provides high switching density.

The optical element may also be refractive, i.e. it more resembles a classic lens whose optical effect can be described with a limited number of focal lengths.

In a preferred embodiment the optical element is connected to a movable electro-mechanical element, thus enabling the orientation, or possibly the position of the optical element to be adjusted by rotation, or possibly translation. This mechanical element can be connected to a base by means of a number of flexible mechanical components, such as torsion bars. The movable mechanical element and the other mechanical components can all be formed from a substrate using abrasive or etching techniques, whether or not combined with lithographic techniques. Here too, a large number of elements can advantageously be fabricated on a small surface area using micromechanical techniques.

In a preferred embodiment the mechanical actuation takes place by means of electrostatic forces or utilizing a piezoelectric effect. The advantage of this is that integration of the required electrodes or piezoelectric layers is possible on the same substrate.

The invention further includes an assembly of a number of such devices, in which the optical elements are installed close together in one or more planes. When the above-mentioned thin-film and etching techniques are used, densities from 100 elements per square centimeter to as much as 10,000 per square centimeter are possible.

The connection of such an assembly to a number of conductors of electromagnetic radiation, such as glass fibers, provides a device with which signals or beams can be switched.

A signal or beam deriving from a conductor drops through an optical element and is transmitted/reflected, converged/diverged and/or changes direction, whether or not dependent on the wavelength. In this case the optical parameters of the incident electromagnetic radiation (such as angle of incidence, convergence, divergence, wavelength distribution and intensity) and the geometrical parameters (such as structure, layer thickness distribution, orientation and position) and material parameters (such as refractive indices and transmission coefficient) of the optical element concerned, together determine the optical parameters of the transmitted electromagnetic radiation (such as angle of incidence, convergence, divergence, wavelength distribution and intensity). The optical parameters of the transmitted signal or beam are adjustable by means of the orientation or position of the optical element. Thus a number of signals or beams can be switched in parallel.

Where the optical elements are positioned in several planes, an optical switch is provided in which the switching possibilities are unlimited in principle.

BRIEF DESCRIPTION OF THE DRAWINGS

The invention is explained in greater detail in the following with reference to, but not limited to the embodiments shown in the figures.

DETAILED DESCRIPTION OF THE PREFERRED EMBODIMENTS

Figure 1:
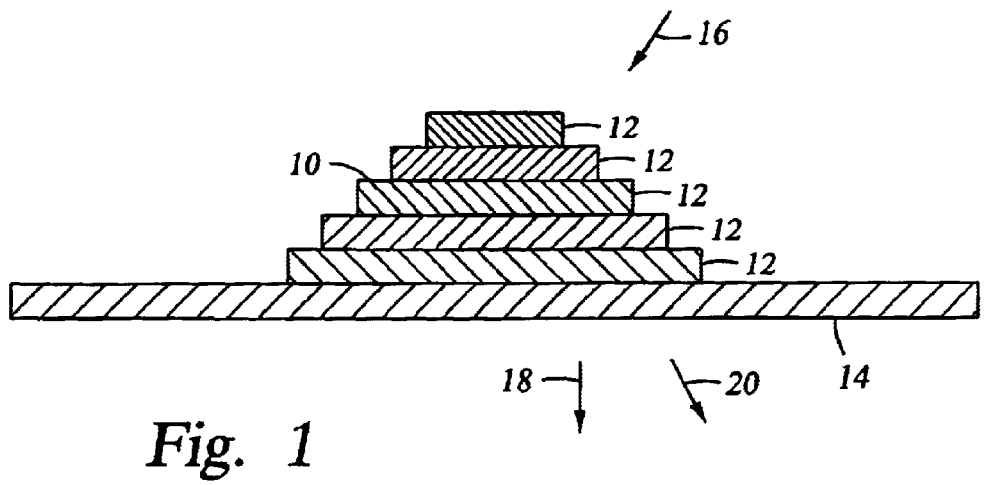
FIG. 1 is a side cross-sectional view of a preferred embodiment of an optical element.

A diffractive optical element 10 usable with the invention and illustrated in the cross-sectional view of FIG. 1 includes several thin layers 12 of, for example, silicon nitride having progressively narrower widths and formed on a light-transmitting substrate 14. Depending upon the rotational position of the substrate 14 about an axis perpendicular to the plane of the illustration and generally parallel to the surface plane of a wafer (or in some embodiments, depending upon the lateral position of the substrate 14 and its optical element), an input light beam 16 is selectively controlled to be transmitted to either of angularly displaced output beams 18, 20. A diffractive element is principally characterized by a grating period. Modifications of the thickness, widths, and asymmetry of the optical element 10 enable it to operate as a refractive element more closely identified with a classic transmissive optical lens principally characterized by a focal length.

Figure 2:
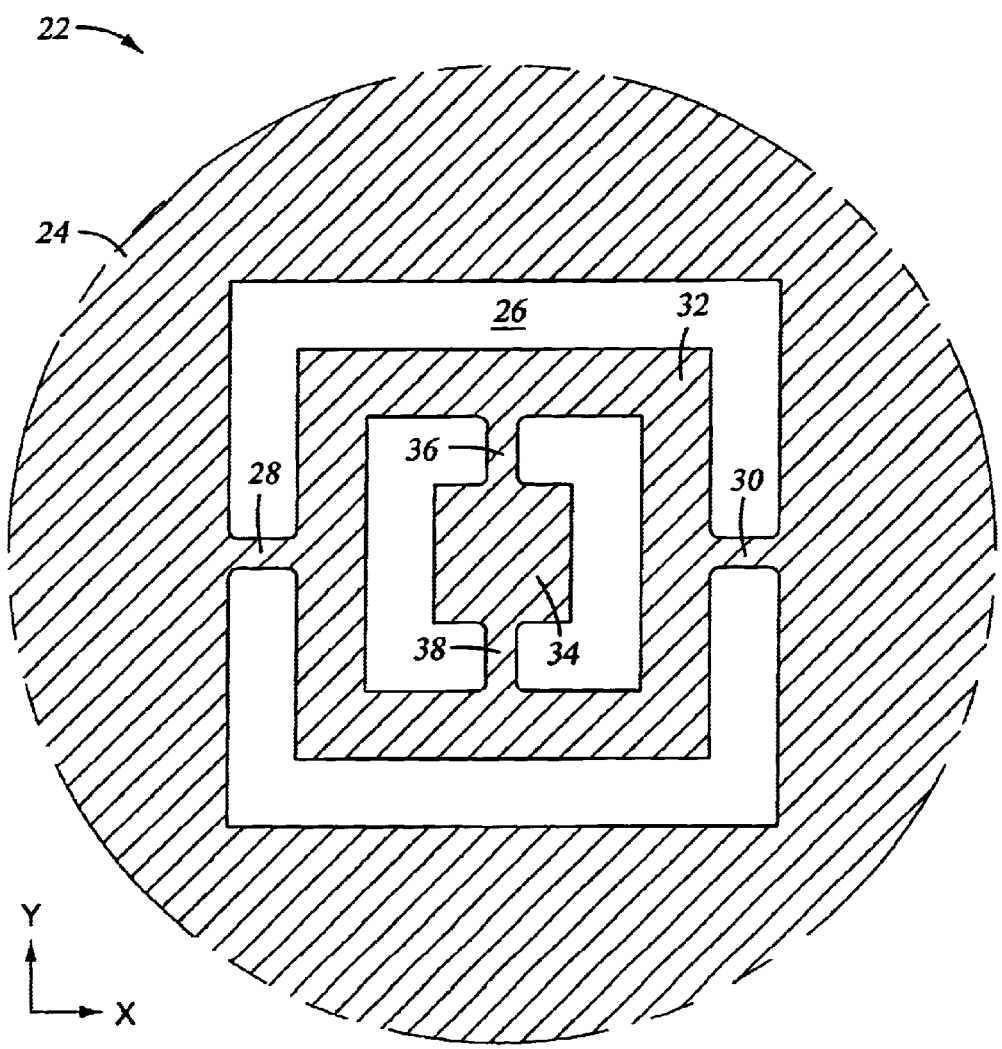
FIG. 2 is a plane view of a preferred embodiment of a mechanical element in the invention.

In FIG. 2 is illustrated in plan view a angularly controllable optical pixel 22 formed from a substrate having a surface layer 24. A horizontal gap 26 in the surface layer 24 is nearly annular in a rectangular shape except for two flexible torsion bars 28, 30 supporting a frame 32 along a first axis. A inner plate 34 is supported within and by the frame 32 by two additional torsion bars 36, 38 arranged along a second axis perpendicular to the first axis. A vertical gap underlies the central plate 7, the frame 32 as well as the torsion bars 26, 30, 36, 38, thereby allowing 2-dimensional rotation of the mechanical element defined by the inner plate 34 with respect to the surface layer 24.

The surface layer 22 may be a layer associated either here or at some point in its fabrication with a monocrystalline silicon wafer. As is well known in the field of micro electromechanical systems (MEMS), such a structure can be manufactured by techniques including photolithographic etching, sputtering, chemical vapor deposition (CVD), and chemical mechanical polishing (CMP) well developed in the manufacture of semiconductor integrated circuits.

The structure of FIGS. 1 and 2 provides a transmissive optical element lying generally parallel to the plane of the one or more wafers forming the final structure, and light is transmitted at least partially therethrough in a direction lying much closer to the normal of the wafer than parallel to the wafer surface.

Figure 3:
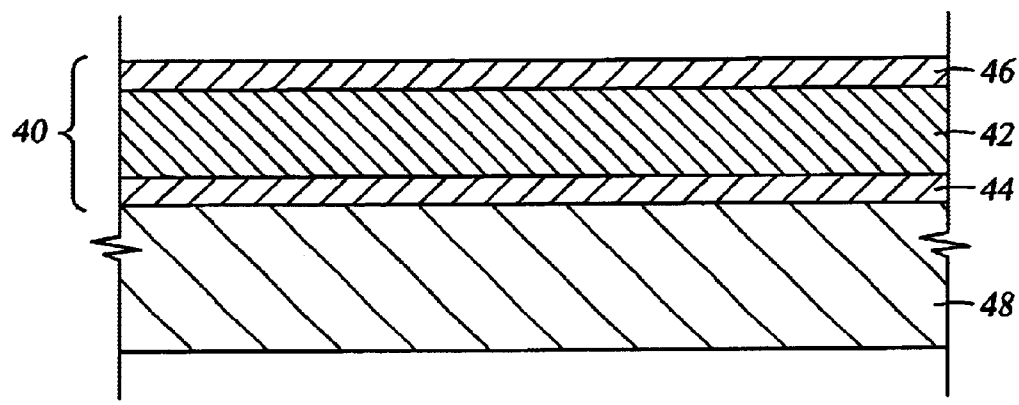
FIG. 3 is a cross-sectional view of a piezoelectric mechanical element usable with the invention.
Figure 4:
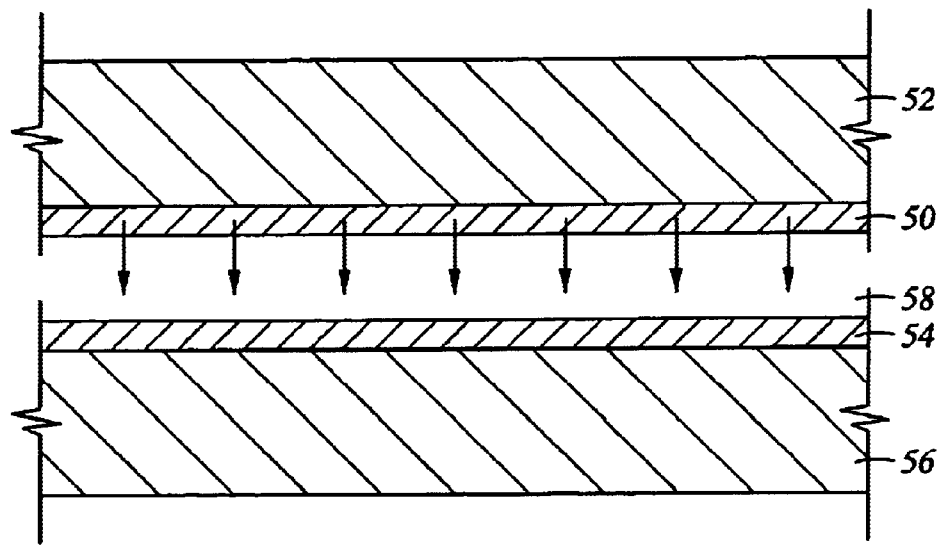
FIG. 4 is a cross-sectional view of an electrostatic mechanic element usable with the invention.

MEMS allows the electrical control of the orientation of micromechanical elements, such as those illustrated in FIGS. 1 and 2. Two forms of electrical control elements are piezoelectric and electrostatic elements. A piezoelectric control configuration is illustrated in the cross-sectional view of FIG. 3. A piezoelectric element 40 including a thin layer 42 of piezoelectric material such as strontium titanate is formed between two electrode layer 44, 46 formed on a substrate 48 constituting the mechanical element. Application of a voltage across the electrode layers 44, 46 causes the piezoelectric layer 42 to deform, thereby affecting the orientation or position of the mechanical element 48 also supporting the optical element used for switching. An electrostatic control configuration is illustrated in the cross-sectional view of FIG. 4. Typically a first electrode 50 is formed on a suspended mechanical element 52 and a second electrode 54 is formed on a base mechanical element 56 with a vertical gap 58 formed between the two electrodes 50, 54. Typically the suspended mechanical element 52 can be rotated, such as in the gimbaled structure of FIG. 2, or be deformed as in a cantilever having an optical element on its free end. Applying an electrical bias across the two electrodes 50, 54 creates an electrostatic attraction between the two mechanical elements 52, 56, thereby attracting them together assuming some flexibility has been imparted to the suspended mechanical element 52. In the 2-dimensional arrangement of FIG. 2, separate electrodes 54 may be positioned beneath selectively biased electrode portions of the frame 32 and the central plate 34 to allow independently addressable electrostatic control of their angular orientations about two perpendicular axes generally within the plane of the wafer and thus providing independent adjustment of the plural elements. Typically, the two mechanical elements 50, 56 are formed from separate silicon wafers bonded together. The pairs of two opposed electrodes for the plural pixels of a 1- or 2-dimensional arrangement are separately controllable to effect the separate angular control of multiple optical elements. Similarly, plural piezoelectric elements of FIG. 3 may be formed in 1- or 2-dimensional arrangements for separately controllable elements.

Figure 5:
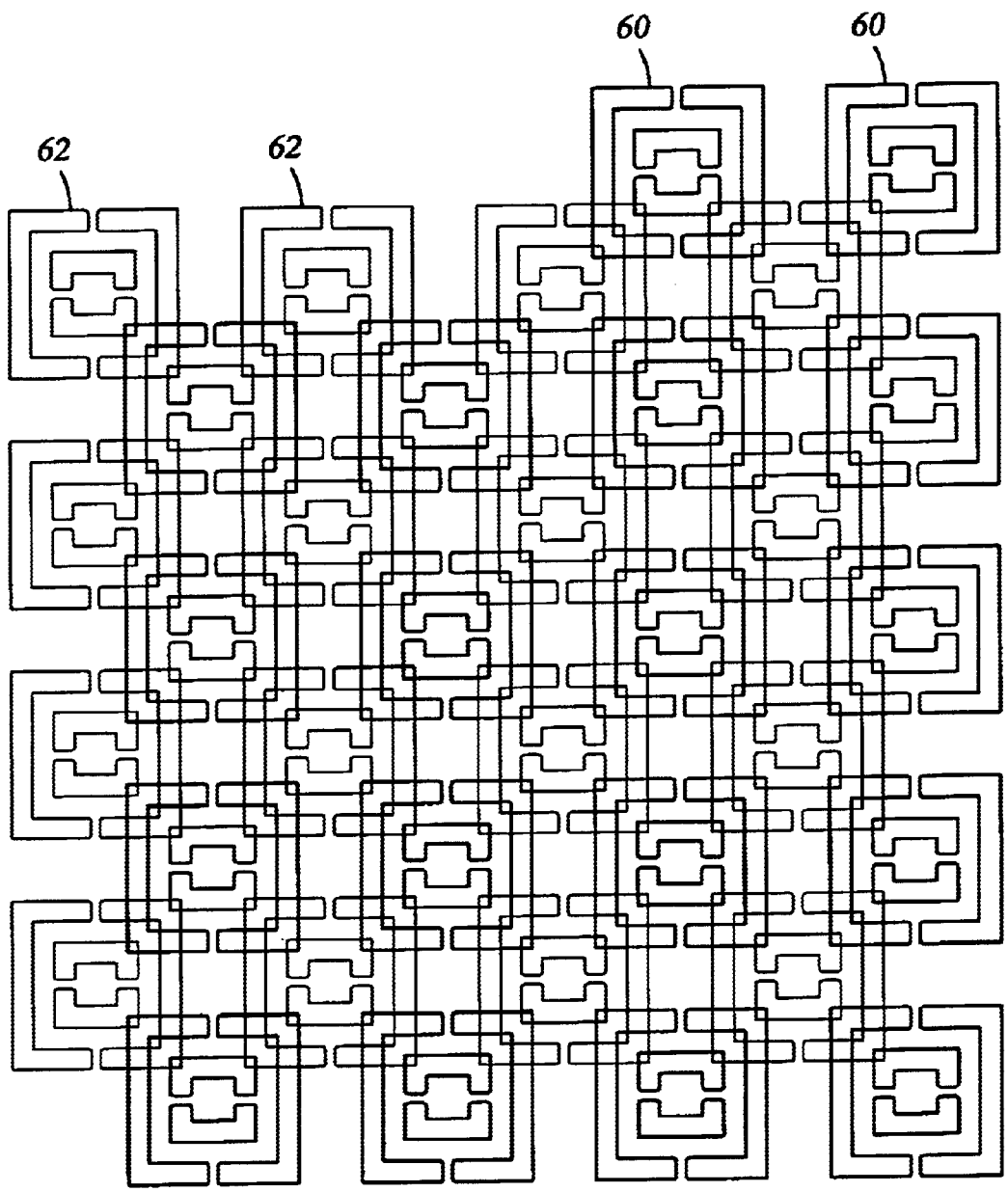
FIG. 5 is a plan view of elements arranged in several layers according to the invention.

In FIG. 5 is shown a schematic plan view of an arrangement of controllable optical elements in two layers, most typically respectively formed on two wafers bonded together. Orientationally controllable optical pixels 60, such as optical elements 10 of FIG. 1 included on respective central plates 34 of FIG. 2, are included in a first wafer or layer and arranged in matrix form, which are offset in two dimensions from a similar matrix arrangement of optical pixels 62 included in a second wafer or layer bonded thereto. Such an arrangement allows a greater density of optical beams in the switching fabric.

Figure 6:
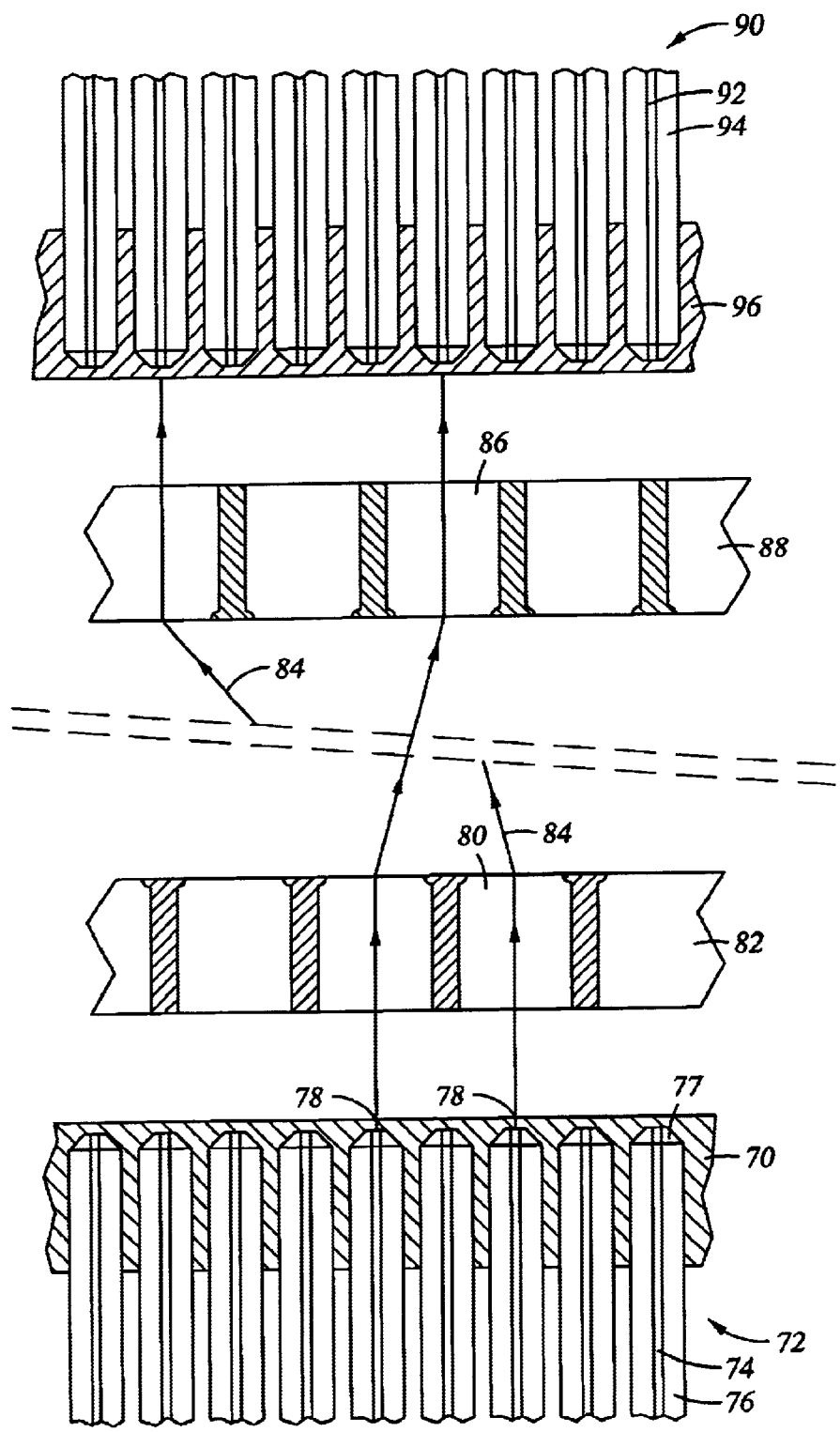
FIG. 6 of a cross-sectional view illustrating an embodiment of an optical switch of the invention with the elements arranged in several layers.

In FIG. 6 is shown a cross-sectional view of an embodiment of an optical switch of the invention including optical elements arranged in multiple layers. An input fixture 70 has grooves rigidly embedding a number of parallel aligned input optical fibers 72, including cores 74 and surrounding claddings 76, both typically formed of a glass such as silica. Collimating portions 77 produce light beams 78 exiting the input fibers 72, which are incident upon and individually selectively deflected in respective optical elements 80 of a first switching layer 82.

The angularly deflected beams 84 arrive at respective optical elements 86 of a second switching layer 88. There the respective beam 84 are again angularly deflected, preferably in a direction parallel to the general propagation direction, to output fibers 90 having cores 92 and claddings 94 and fixedly embedded in a fixture 96. Preferably the two switching layers 82, 88 are bonded together, and more preferably the fiber fixtures 70, 96 are also bonded therewith. In a preferred MEMS fabrication technique, the two switching layers 82, 88 are formed in separate wafers, which are bonded together either after completion of the switching fabrication or between the fabrication of the switching structure of the two levels. As illustrated, the light is transmitted through the wafer structure predominantly in the direction normal to the planes of the wafers.

The invention is not limited to the described embodiment. The deflection of the optical beams may be controlled according to the angle of incidence, convergence, divergence, wavelength distribution, and intensity. Further, the beam may be controlled in its incoming optical parameters of its optical element such as angle of incidence, convergence, divergence, wavelength distribution, and intensity, according to its geometrical parameters, such as structure, thickness distribution, orientation, and position, and according to its material parameters, such as the refractive indices, transmissivity, etc. These together determine the optical parameters of the transmitted beam, such as angle of incidence, convergence, divergence, wavelength distribution, and intensity. Depending upon the above parameters, the incoming beam is selectively transmitted, selectively converged or diverged, or changes directions, or any combination of these with or without dependence upon the wavelength.

In principle, the number of possible beams, the number of possible layers, and the number of switching possibilities are nearly unlimited.

The invention is applicable to optical switches in telecommunications equipment, computers, and visual displays among other possibilities.

What is claimed is:

1. An assembly, comprising:
    a first plurality of optical devices formed from a first substrate and distributed in a plane of said first substrate; and
    a second plurality of optical devices formed from a second substrate and distributed in a plane of said second substrate;
    wherein said first and second substrates are bonded together and allow a beam of light to be transmitted through optical elements on both of said substrates; and
    wherein each of said optical devices formed on one of said first and second substrates comprises:
        a deformable mechanical element extending in a direction parallel to a principal surface of said one substrate;
        an optical element supported on said mechanical element and providing at least partial transmission therethrough of light incident thereupon into any of plurality of directions extending closer to a normal to said principal surface than parallel to said principal surface; and
        an electrical control element controllably deforming said mechanical element and thereby selecting one of said plurality of directions.

2. The assembly of claim 1, wherein a position of a mechanical element on said first substrate through which said beam passes determines which of the mechanical elements on said second substrate said beam passes.

3. The assembly of claim 1, wherein said two substrates are bonded together respectively along said principal surfaces thereof.

4. A method of manufacturing an optical switch, comprising the steps of:
    a first step of fabricating in a first substrate an array of a plurality of optical switching elements;
    a second step of fabricating in a second substrate an array of a plurality of optical switching elements; and
    bonding together said substrates so that the switching elements of said two substrates face each other;
    wherein each of said optical switching elements includes
        a deformable mechanical element,
        an electrical control element controlling an angular orientation of said mechanical element, and
        a transmissive optical element supported on said mechanical element and allowing passage of light between said two arrays of switching elements.

5. The method of claim 4, wherein said bonding step is performed after said two fabricating steps.

6. The method of claim 4, wherein said two fabricating steps include micro electromechanical fabricating techniques.

7. The method of claim 6, wherein said techniques include lithography, etching, and at least one of sputtering and chemical vapor deposition.

8. The method of claim 4, wherein said first and second substrates are bonded together respectively along said principal surfaces thereof.

9. A method of manufacturing an optical switch, comprising the steps of:
    a first step of fabricating in a first substrate an array of a plurality of optical switching elements;
    a second step of fabricating in a second substrate an array of a plurality of optical switching elements; and
    bonding together said substrates so that the switching elements of said two substrates face each other;
    wherein each of said optical switching elements includes
        a deformable mechanical element,
        an electrical control element controlling an angular orientation of said mechanical element, and
        a transmissive optical element supported on said mechanical element and allowing passage of light between said two arrays of switching elements, wherein said bonding step is performed between said two fabricating steps; and
    wherein said bonding step is performed between said two fabricating steps.

10. An optical switch, comprising:
    a first substrate having formed therein a first plurality of optical switching elements; and
    a second substrate having formed therein a second plurality of said optical switch elements optically associated with said first plurality of optical switching elements;
    wherein each said optical switching element comprises
        a deformable mechanical element extending in a direction parallel to a principal surface of a corresponding one of said substrates and deformable in a direction perpendicular to said principal surface,
        an optical element supported on said mechanical element and providing at least partial transmission therethrough of light incident thereupon into any of plurality of directions extending closer to a normal to said principal surface than parallel to said principal surface, and
        an electrical control element controllably deforming said mechanical element and thereby selecting one of said plurality of directions.

11. The optical switch of claim 10, wherein said two substrates are bonded together respectively along said principal surfaces thereof with said switching elements of said first substrate face said switching elements of said second substrate.

12. The optical switch of claim 10, wherein said each mechanical element includes a plate supporting said optical element and being rotatably supported by two torsion beams.

13. The optical switch of claim 10, wherein said optical elements are refractive.

14. The optical switch of claim 10, wherein said optical elements are diffractive.

15. An assembly of a plurality of individually adjustable optical switching devices formed from a first substrate and a second substrate, each substrate having a respective principal surface and wherein said optical switching devices are distributed two dimensionally in said respective principal surfaces, comprising:
- a first plurality of said individually adjustable optical switching devices formed from said first substrate and distributed in a plane of said first substrate; and
- a second plurality of said individually adjustable optical switching devices formed from said second substrate and distributed in a plane of said second substrate;
- wherein said first and second substrates are bonded together and allow a beam of light to be transmitted through optical elements on both of said substrates; and
- wherein each of said individually adjustable optical switching devices comprises
  - a deformable mechanical element extending in a direction parallel to said respective principal surface,
  - an optical element supported on said mechanical element and providing at least partial transmission therethrough of light incident thereupon into any of plurality of directions extending closer to normal to said respective principal surface than parallel to said respective principal surface, and
  - an electrical control element controllably deforming said mechanical element and thereby selecting one of said plurality of directions.

16. An optical switch, comprising:
- a first substrate having formed within a first principal surface thereof a first array of at least partially transmissive first optical elements which are individually tiltable about respective first axes extending parallel to said first principal surface; and
- a second substrate having formed within a second principal surface thereof a second array of at least partially transmissive second optical elements which are individually tiltable about respective second axes extending parallel to said second principal surface;
- wherein optical paths are selectively formed between said first and second optical elements by tilting selected ones of said first and second optical elements.

17. The optical switch of claim 16, wherein said first and second substrates are juxtaposed with said first and second principal surfaces facing each other.

18. The optical switch of claim 16, wherein said first and second substrates are bonded together along said first and second principal surfaces.

19. The optical switch of claim 16, further comprising control elements respectively associated with individual ones of said first and second optical elements to effect tilting thereof.

20. The optical switch of claim 16, wherein said first and second arrays are both two-dimensional arrays.

* * * * *